(12) United States Patent
Stiesdal

(10) Patent No.: US 8,084,879 B2
(45) Date of Patent: Dec. 27, 2011

(54) WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 517 days.

(21) Appl. No.: 12/313,613

(22) Filed: Nov. 21, 2008

(65) Prior Publication Data
US 2009/0134630 A1    May 28, 2009

(30) Foreign Application Priority Data

Nov. 26, 2007   (EP) ..................................... 07022880

(51) Int. Cl.
*F03D 1/00* (2006.01)
*F03D 11/00* (2006.01)
*H02K 1/30* (2006.01)

(52) U.S. Cl. ............ 290/55; 310/90; 310/266; 310/401; 310/418

(58) Field of Classification Search .................... 290/55; 310/401, 418, 420
See application file for complete search history.

(56) References Cited

U.S. PATENT DOCUMENTS

| | | | |
|---|---|---|---|
| 6,476,513 B1* | 11/2002 | Gueorguiev | 290/55 |
| 6,483,199 B2 | 11/2002 | Umemoto et al. | |
| 6,781,276 B1 | 8/2004 | Stiesdal et al. | |
| 6,794,781 B2* | 9/2004 | Razzell et al. | 310/114 |
| 7,084,522 B2* | 8/2006 | Wobben | 290/55 |
| 7,119,453 B2 | 10/2006 | Bywaters et al. | |
| 7,538,446 B2* | 5/2009 | Bonnet | 290/55 |
| 7,547,985 B2* | 6/2009 | Takaichi et al. | 290/55 |
| 7,830,063 B2* | 11/2010 | Jansen et al. | 310/266 |
| 7,956,484 B2* | 6/2011 | Stiesdal | 290/55 |
| 2006/0152014 A1 | 7/2006 | Grant et al. | |
| 2007/0290509 A1* | 12/2007 | Nitzpon | 290/55 |
| 2009/0134629 A1* | 5/2009 | Stiesdal | 290/55 |
| 2009/0309369 A1* | 12/2009 | Llorente Gonzalez | 290/55 |
| 2010/0219642 A1* | 9/2010 | Kim et al. | 290/55 |

FOREIGN PATENT DOCUMENTS

| | | |
|---|---|---|
| DE | 10044262 A1 | 3/2002 |
| DE | 102004030929 B3 | 10/2005 |
| EP | 1351377 A2 | 10/2003 |
| EP | 1 641 102 A1 | 3/2006 |
| WO | 0205408 A1 | 1/2002 |
| WO | 0233254 A1 | 4/2002 |
| WO | WO 02/057624 A1 | 7/2002 |
| WO | WO 03/023943 A2 | 3/2003 |

* cited by examiner

*Primary Examiner* — Burton Mullins

(57) ABSTRACT

The invention concerns a wind turbine comprising a retaining arrangement, a main shaft and a direct drive generator comprising a rotor having a first and a second supporting element and a stator having a first and a second supporting element, wherein the main shaft is pivoted relatively to the retaining arrangement by a first and a second bearing, the first supporting element of the rotor and the main shaft are connected with each other, the first supporting element of the stator is supported on the main shaft and/or on the first supporting element of the rotor by a third bearing, the second supporting element of the stator and the retaining arrangement are connected with each other and the second supporting element of the rotor is supported on the retaining arrangement and/or on the second supporting element of the stator by a fourth bearing.

20 Claims, 2 Drawing Sheets

WIND TURBINE

CROSS REFERENCE TO RELATED APPLICATIONS

This application claims priority of European application No. 07022880.4 filed Nov. 26, 2007, which is incorporated by reference herein in its entirety.

FIELD OF THE INVENTION

The invention relates to a wind turbine comprising a direct drive generator.

BACKGROUND OF THE INVENTION

In principle there are two main types of wind turbines in view of the drive configuration of a wind turbine. The first type of a wind turbine is the more classical type of a wind turbine comprising a gearbox arranged between a main shaft and a generator of the wind turbine. The second type of a wind turbine is a gearless type comprising a direct drive generator. Such a direct drive generator can be made as a synchronous generator with winded rotor or with permanent magnets attached to the rotor, or it can be designed as an alternative type of a generator. Independently from the type of a direct drive generator it is desirable that the width of the air gap between the rotor and the stator of the generator is preferably maintained stable or at least within certain tolerances during the operation of the wind turbine and the direct drive generator respectively even when the arrangement of wind turbine rotor, main shaft and direct drive generator is subject to loads.

Therefore different bearing arrangements of a drive configuration of a wind turbine comprising a direct drive generator were developed. Up to now the classical bearing arrangement of a direct drive generator is a two-bearing arrangement. Thereby the rotor of the generator which is connected to the wind turbine rotor is supported with two bearings towards a stationary inner shaft or a fixed inner shaft. The stator is on one side attached to the stationary inner shaft. Thus the rotor can turn relatively to the stator around the stationary inner shaft. Wind turbines with such a design are e.g. described in EP 1 641 102 A1 and U.S. Pat. No. 6,483,199 B2. The drawback of such a design is that the one-side support of the stator makes it difficult to maintain the width of the air gap at least substantially constant at the unsupported side of the stator in particular when the entire generator structure is not only subject to gravity and mass inertia but also to unbalanced magnetic pull. In order to reduce this drawback a direct drive generator with such a two-bearing arrangement needs a large and heavy stator support structure capable of absorbing relatively large bending moments of the stator. Such a stator structure is e.g. described in WO 02/05408 A1 wherein the stator structure comprises a support construction having a plenty of support arms.

In an alternative design the two-bearing arrangement is replaced with a single bearing with a stationary inner bearing part attached to a stationary inner shaft and a rotating outer bearing part supporting the rotor of the direct drive generator. Wind turbines comprising a direct drive generator with a single bearing are disclosed in US 2006/0152014 A1 and WO 02/057624 A1. The replacement of the two bearings with a single bearing does not substantially change the drawback of the unilaterally supported stator structure.

In some further solutions the stationary inner shaft concept is replaced with a rotating shaft concept. Since the stator of the generator is supported on both sides according to the rotating shaft concept, it is easier to maintain the width of the air gap between the rotor and the stator of the generator at least substantially constant. There are two variants of the rotating shaft concept known, one with a two-bearing arrangement and one with a four-bearing arrangement.

According to the two-bearing arrangement the bearings of the generator act as bearings of a main shaft for the wind turbine which main shaft is connected to the wind turbine rotor. The stator structure is supported towards the main shaft and attached to a bedplate of the wind turbine. Wind turbines having such a design are disclosed in U.S. Pat. No. 7,119,453 B2 and WO 03/023943 A2. A drawback of this design is that the stator structure needs to be dimensioned to absorb and transfer all wind turbine rotor loads, i.e. the weight of the wind turbine rotor and all asymmetric aerodynamic loads to maintain the width of the air gap within the necessary tolerances. On large wind turbines this leads to very heavy and expensive stator structures.

In the four-bearing arrangement the main shaft of the wind turbine which is connected to the wind turbine rotor on its one end is supported by its own two bearings and carries at its other end the direct drive generator. The direct drive generator has a two-bearing arrangement for the centring of the rotor inside the stator. An example of such a wind turbine is described in U.S. Pat. No. 6,781,276 B1. In this main shaft mounted arrangement the generator stator is carried by the generator rotor and torque is transferred from the generator to the wind turbine bedplate through a torque arm arrangement. The torque arm arrangement needs to comprise some kind of flexibility, e.g. implemented with rubber elements, to allow for minor misalignments between the main shaft—generator structure and the turbine bedplate. The bilateral support of the stator on the rotor allows for a relatively lightweight stator structure. The main drawback of this design is that the full torque has at least partially to pass through the bearings. Furthermore, for large wind turbines the torque arm arrangement becomes a substantial and heavy structure.

SUMMARY OF THE INVENTION

It is therefore an object of the present invention to provide a wind turbine as initially mentioned in such a way, that the wind turbine has preferably a comparatively lightweight design.

This object is inventively achieved by a wind turbine comprising a retaining arrangement, a main shaft and a direct drive or a directly driven generator comprising a rotor having a first and a second supporting element and a stator having a first and a second supporting element, wherein the main shaft rotates relative to the retaining arrangement by a first and a second bearing, the first supporting element of the rotor and the main shaft are at least indirectly connected with each other, the first supporting element of the stator is supported on the main shaft and/or on the first supporting element of the rotor by a third bearing, the second supporting element of the stator and the retaining arrangement are connected with each other and the second supporting element of the rotor is supported on the retaining arrangement and/or on the second supporting element of the stator by a fourth bearing. Thus the inventive wind turbine comprises a four bearing arrangement. Thereby the first and the second bearing support the main shaft to which the wind turbine rotor is attached. The main shaft transfers the wind turbine rotor torque to the generator rotor and supports preferably at the front side of the generator both the rotor of the generator and the stator of the generator. Whilst the rotor, whose first supporting element is at least indirectly thinly arranged on the main shaft, is thus directly supported by the main shaft through the at least indirect firm arrangement on the main shaft, the stator is supported through the third bearing, which is at least indirectly arranged on the main shaft and/or on the first supporting element of the rotor and connected to the first supporting element of the stator. On the other side of the generator, preferably on the rear side of the generator the generator is supported on the retaining arrangement. Whilst the stator, whose second supporting element is at least indirectly thinly arranged on the retaining arrangement, is hence directly supported by the retaining arrangement through the at least indirect firm arrangement on the retaining arrangement, the rotor is supported through the fourth bearing, which is at least indirectly arranged on the retaining arrangement and/or on the second supporting element of the stator and connected to the second supporting element of the stator.

Based on this inventive design of a wind turbine the rotor of the generator is able to turn together with the main shaft. Furthermore both the rotor and the stator of the generator are supported on both sides of the generator. Thus the inventive concept permits the maintenance of a relatively narrow, well defined air gap between the rotor and the stator of the generator because of the two-side support of the rotor and the stator in form of the supporting elements. Thus not only the rotor but also the stator and hence the whole wind turbine are able to be constructed more lightweight. In addition to the loads from the wind turbine rotor and the main shaft the first and the second bearing carry substantially approximately half of the weight of the generator; approximately the other half of the weight of the generator is directly supported on the retaining arrangement.

According to an embodiment of the invention the first supporting element of the rotor comprises a first ring like or ring-shaped rotor end plate and/or the second supporting element of the rotor comprises a second ring like or ring-shaped rotor end plate. In a comparable way the first supporting element of the stator can comprise a first ring like or ring-shaped stator end plate and/or the second supporting element of the stator can comprise a second ring like or ring-shaped stator end plate. Preferably all mentioned supporting elements of the rotor and the stator are shaped as ring like end plates.

In a further development of the invention at least one supporting element e.g. at least one ring like end plate of the rotor and/or the stator is substantially perpendicularly arranged relatively to a center axis of the main shaft and/or wherein the at least one supporting element e.g. at least one ring like end plate is at least partially in a certain extent flexible in the directions of the center axis of the main shaft. Preferably all supporting elements in particular in form of the ring like end plates are substantially perpendicularly arranged relatively to the center axis of the main shaft. Thereby the four ring like end plates are arranged substantially in parallel to each other.

According to an embodiment of the invention at least one supporting element of the rotor and at least one supporting element of the stator are at least partially in a certain extent flexible in the directions of the center axis of the main shaft. Preferably the first supporting element of the rotor e.g. the first ring like rotor end plate thinly supported on the main shaft and the second supporting element of the stator e.g. the second ring like stator end plate firmly supported on the retaining arrangement are at least partially in a certain extent flexible in the directions of the center axis of the main shaft.

The four bearing structure or arrangement can be sometimes statically undetermined. In this case any misalignments due to mounting tolerances or any deformations arising as a result of gravity or external loads to the main shaft and/or the direct drive generator could potentially lead to an uneven load distribution between the four bearings of the wind turbine which in turn could cause a premature bearing failure. Therefore the supporting elements particularly the ring like end plates of the rotor and the stator of the generator are substantially perpendicularly arranged relatively to the center axis of the main shaft and at least one ring like end plate of the rotor and at least one ring like end plate of the stator are at least partially in a certain adequate extent flexible in the directions of the center axis of the main shaft. As mentioned before preferably the first ring like rotor end plate firmly supported on the main shaft and the second ring like stator end plate thinly supported on the retaining arrangement are at least partially in a certain extent flexible in the directions of the center axis of the main shaft. These both ring like end plates having a certain flexibility are chosen because they are firmly supported on the main shaft and the retaining arrangement respectively. In this way a higher load on the third and the forth bearing can be avoided which would occur when e.g. the first stator end plate and the second rotor end plate would comprise the flexibility.

Thus the potential problem of a static indeterminacy of the four bearing arrangement is in case of this embodiment of the invention eliminated by establishing a sufficient flexibility of the first ring like rotor end plate and the second ring like stator end plate in the directions of the center axis of the main shaft. These ring like end plates act like membranes supporting the rotor and the stator substantially firmly in the radial direction so as to maintain the air gap, but flexing readily so as to enable e.g. a bending of the main shaft with no major resistance. Thereby the ring like end plates are preferably flat and have such dimensions e.g. subject to the material and/or the structure of the ring like end plates that the ring like end plates have a comparatively little bending stiffness. They simply flex passively when e.g. the main shaft is shifted a bit by deflection, while at the same time maintaining the width of the air gap.

According to another embodiment of the invention the rotor comprises a joining element connecting the first and the second supporting element of the rotor with each other. Typically the joining element of the rotor is a ring like element which carries on its outer perimeter components of the rotor e.g. permanent magnets.

According to a variant of the invention the stator comprises a casing element connecting the first and the second supporting element of the stator with each other. Preferably the first supporting element of the stator, the second supporting element of the stator and the casing element build up a substantially hollow cylinder like housing substantially arranged around the rotor. As a rule the casing element of the stator is a ring like element which carries on its inner perimeter electrical components of the stator e.g. electrical stator elements.

According to a further variant of the invention the fourth bearing comprises an inner bearing shell and an outer bearing shell, wherein the inner bearing shell of the fourth bearing is connected to the retaining arrangement and/or to the second supporting element of the stator. Subject to the attachment of the second supporting element of the stator to the retaining arrangement the inner bearing shell of the fourth bearing is normally firmly but detachably attached to the second supporting element of the stator or the retaining arrangement.

In a variant of the invention the second supporting element of the rotor and the outer bearing shell of the fourth bearing are connected with each other. As a rule the second supporting element of the rotor is firmly but detachably attached to the outer bearing shell of the fourth bearing.

In a further embodiment of the invention the third bearing comprises an inner bearing shell and an outer bearing shell, wherein the inner bearing shell of the third bearing and the main shaft are connected with each other. Preferably the inner bearing shell of the third bearing is firmly but detachably attached to the main shaft.

According to a variant of the invention the first supporting element of the rotor and the inner bearing shell of the third bearing are connected with each other. Preferably the first supporting element of the rotor is firmly but detachably attached to the inner bearing shell of the third bearing.

In another variant of the invention the first supporting element of the stator and the outer shell of the third bearing are connected with each other. Preferably the first supporting element of the stator is firmly but detachably attached to the outer bearing shell of the third bearing.

In a further development of the invention the retaining arrangement comprises a bedplate and/or a main frame and/or a stationary shaft. Preferably the main frame e.g. in form of a retaining arm is arranged on the bedplate and the stationary shaft is attached to the main frame. In an embodiment of the invention the main shaft rotates relative to the remaining arrangement on the stationary shaft with the first and the second bearing.

According to a further embodiment of the invention the wind turbine comprises a tower, wherein the direct drive generator is arranged on the upwind or on the downwind side of the tower.

BRIEF DESCRIPTION OF THE DRAWINGS

The invention will in the following be explained in more detail with reference to the schematic drawings, wherein.

DETAILED DESCRIPTION OF THE INVENTION

Figure 1:
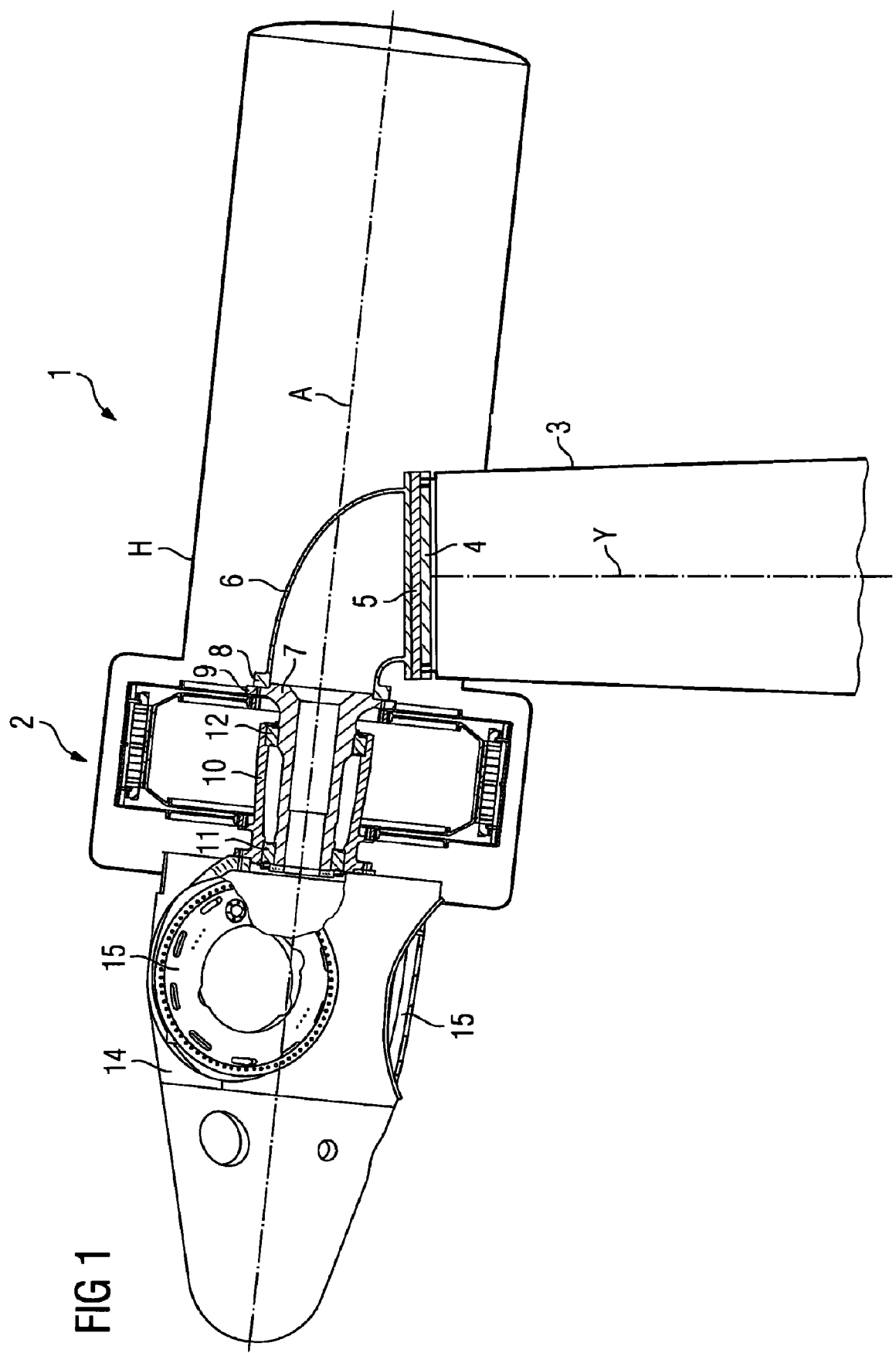
FIG. 1 shows a part of an inventive wind turbine and
FIG. 2 shows in an enlarged illustration the main shaft and a part of the direct drive generator of the wind turbine of FIG. 1.

FIG. 1 shows schematically a first embodiment of an inventive wind turbine 1 comprising a direct drive or directly driven generator 2 which is arranged on the upwind side of a tower 3 of the wind turbine 1.

A tower flange 4 is arranged on the top of the tower 3. A retaining arrangement is arranged on the tower flange 4 comprising in case of the present embodiment of the invention a bedplate 5, a retaining frame in form of a retaining arm 6 and a stationary or fixed hollow shaft 7. The bedplate 5 is attached to the tower flange 4. The wind turbine 1 comprises in a not explicitly shown manner a yaw system for turning the bedplate 5 of the wind turbine 1 around the center axis Y of the tower 3 together with the other components of the wind turbine 1 which are directly or indirectly attached to the bedplate 5.

The retaining arm 6 is on its base side directly arranged on the bedplate 5. On the other side the retaining arm 6 comprises a flange 8. The stationary shaft 7 is attached to the flange 8 with a flange 9. The ring shaped flange 8 of the retaining arm 6 and the ring shaped flange 9 of the stationary shaft 7 are bolted together with a plurality of bolts arranged around the ring shaped flanges.

A main shaft 10 or a main rotor pipe 10 rotates relative to the remaining arrangement on the stationary shaft 7 by means of a first main bearing 11 and a second main bearing 12. Each main bearing 11, 12 supported by the stationary shaft 7 comprises an inner and an outer bearing shell. The inner bearing shells of the both main bearings 11, 12 are mounted on the stationary shaft 7, whilst the outer bearing shells of the both main bearings 11, 12 are fitted inside the main shaft 10.

On the front end the main shaft 10 comprises a ring like flange 13. The ring like flange 13 is firmly, but detachably connected to a hub 14 of the wind turbine 1. The hub 14 comprises three mounting devices 15 for three not explicitly shown, but well known wind rotor blades.

In case of the present embodiment of the invention the mentioned direct drive or directly driven generator 2 is substantially arranged around the main shaft 10. The direct drive generator 2 comprises a rotor 16 or a rotor arrangement 16 and a stator 17 or a stator arrangement 17.

Figure 2:
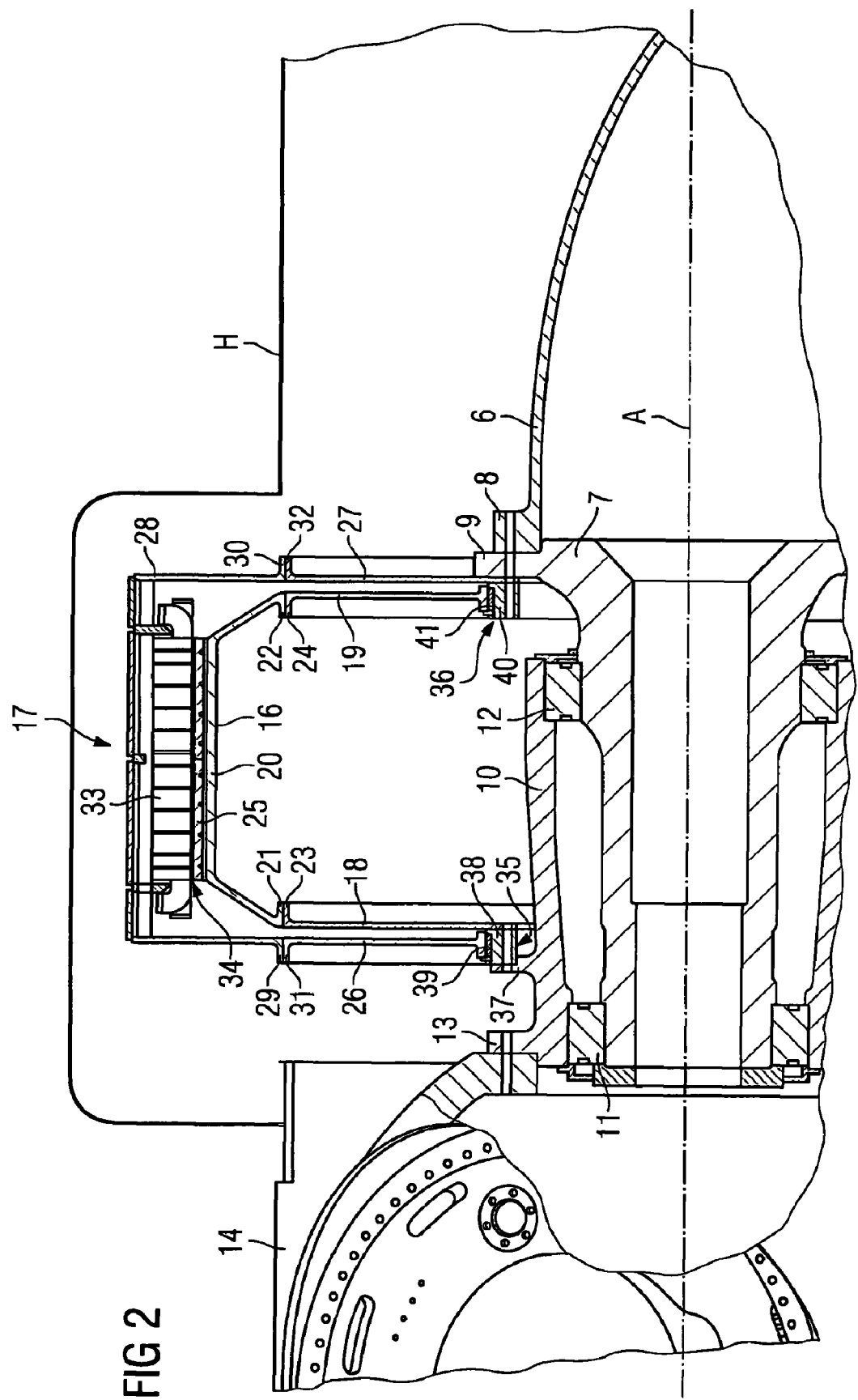

The rotor 16 comprises in case of the present embodiment of the invention a first supporting element 18 in form of a first ring like rotor end plate 18, a second supporting element 19 in form of a second ring like rotor end plate 19 and a ring shaped joining element 20 connecting the first 18 and the second 19 rotor end plate with each other. As shown in FIG. 2 the joining element 20 has a flange 21 on the front side and a flange 22 on the rear side. The first or front rotor end plate 18 has a flange 23 and the second or rear rotor end plate 19 has a flange 24. In case of the present embodiment of the invention the flanges 21 and 23 and the flanges 22 and 24 are bolted together to build up the rotor 16. Thereby the joining element 20 carries around its outer perimeter not in detail shown permanent magnets 25.

The stator 17 comprises in case of the present embodiment of the invention a first supporting element 26 in form of a first ring like stator end plate 26, a second supporting element 27 in form of a second ring like stator end plate 27 and a ring shaped casing element 28 connecting the first 26 and the second 27 stator end plate with each other. As shown in FIG. 2 the casing element 28 has a flange 29 on the front side and a flange 30 on the rear side. The first or front stator end plate 26 has a flange 31 and the second or rear stator end plate 27 has a flange 32. In case of the present embodiment of the invention the flanges 29 and 31 and the flanges 30 and 32 are bolted together to build up the stator 17. Thereby the casing element 28 carries around its inner perimeter not in detail shown, but well known electrical stator elements 33 e.g. the stator winding, the stator yoke and so on.

The electrical stator elements 33 of the stator 17 and the permanent magnets 25 of the rotor 16 are arranged oppositely to each other with an intermediate ring like air gap 34. The width of the air gap 34 is so small that the air gap 34 is not explicitly visible in FIG. 2. In the following it is only spoken from the air gap 34 between the rotor 16 and the stator 17.

In order that the rotor 16 can turn together with the main shaft 10 around a center axis A of the main shaft 10 and relatively to the stator 17 the wind turbine 1 in particular the direct drive generator 2 comprise a third or front generator bearing 35 and a fourth or rear generator bearing 36.

The third bearing 35 is in case of the present embodiment of the invention attached to a flange 37 of the main shaft 10. More precisely the inner bearing shell 38 of the third bearing 35 is firmly attached to the flange 37 of the main shaft 10. The inner bearing shell 38 of the third bearing 35 is furthermore firmly attached to the first rotor end plate 18, which supports the front part of the rotor 16. The outer bearing shell 39 of the third bearing 35 is firmly connected to the first stator end plate 26, which supports the front part of the stator 17.

The rear part of the stator 17 is supported by the second stator end plate 27, which is firmly connected to the flange 9 of the stationary shaft 7 and thus to the retaining arrangement. In case of the present embodiment of the invention the inner bearing shell 40 of the fourth bearing 36 is firmly attached to the second stator end plate 27 and the second rotor end plate 19 supporting the rear part of the rotor 16 is firmly connected to the outer bearing shell 41 of the fourth bearing 36.

Based on the described arrangement comprising the main shaft 10, the first main bearing 11, the second main bearing 12, the rotor 16, the stator 17, the third bearing 35 and the fourth bearing 36 the main shaft 10 turns in operation of the wind turbine 1 together with the rotor 16 relatively to the stator 17.

For avoiding situations in which the four bearing arrangement is statically undetermined in case of the present embodiment of the invention the first rotor end plate 18 firmly supported on the main shaft 10 and the second stator end plate 27 firmly supported on the retaining arrangement comprise a certain and sufficient extent of flexibility in the directions of the center axis A of the main shaft 10. Thereby these end plates 18, 27 act like membranes supporting the rotor 16 and the stator 17 substantially firmly in the radial direction so as to maintain the width of the air gap 34, but flexing readily so as to allow e.g. a bending of the main shaft 10 with no major resistance. In particular the end plates 18, 27 have such dimensions that they have a comparatively little bending stiffness. They simply flex passively when e.g. the main shaft 10 is shifted a bit by deflection. Thus when a bending of the main shaft 10 occurs to which the rotor 16 and the stator 17 are connected the first rotor end plate 18 and the second stator end plate 27 bend in substantially a respective way in the directions of the center axis A wherein the width of the air gap 34 is maintained substantially constant or within required tolerances.

As a consequence of the four bearing arrangement, in addition to the loads from the wind turbine rotor and the main shaft 10 the two main bearings 11, 12 carry approximately half of the weight of the generator 2, approximately the other half of the weight of the generator 2 is directly supported on the retaining arrangement. The third or front generator bearing 35 carries approximately half of the weight of the stator 17, approximately the other half of the weight of the stator 17 is supported on the retaining arrangement. The fourth or rear generator bearing 36 carries approximately half of the weight of the rotor 16, approximately the other half of the weight of the rotor 16 is supported on the main shaft 10.

Based on the described design or structure of the wind turbine in particular based on the described generator arrangement comprising the third and fourth bearing the rotor 16 and the stator 17 are supported on both sides, the front side and the rear side. This enables a more lightweight rotor and in particular a more lightweight stator construction with less dimensions of the stator structure in particular of the stator support structure like the end plates and so on to maintain in operation of the wind turbine 1 the width of the air gap 34 within the necessary tolerances along the directions of the center axis A and around the perimeter.

Unlike to the afore described embodiment of the invention the first stator end plate 26 and the second rotor end plate 19 are able to comprise the certain extent of flexibility in the directions of the center axis A of the main shaft 10, whilst the first rotor end plate 18 and the second stator end plate 27 have not these flexibility. Also in this case the width of the air gap 34 is able to be held substantially constantly or at least within required tolerances.

The ring like rotor end plate and the ring like stator end plate which have the certain flexibility need not to have the flexibility in the whole end plates. Thus the ring like end plates are able to have different areas. The respective ring like rotor end plate may have e.g. a comparatively rigid area e.g. for the attachment of the third bearing and an area having the mentioned flexibility in the directions of the center axis A. In the same way the respective ring like stator end plate may have e.g. a comparatively rigid area e.g. for the attachment of the fourth bearing and an area having the mentioned flexibility in the directions of the center axis A.

The first rotor end plate is able to be directly arranged on the main shaft. In this case the third bearing is able to be directly attached to the main shaft or to the first rotor end plate.

It is not necessary to attach the fourth bearing to the second stator end plate. The fourth bearing is also able to be directly attached to the retaining arrangement e.g. the stationary shaft or the retaining frame or arm.

As a rule the ring like end plates are made of an appropriate metal or metal alloy.

Unlike described before the direct drive generator is also able to be arranged on the downwind side of the tower.

By the way the wind turbines 1 comprise a housing H normally called the nacelle which contain the generator 2 and at least a part of the retaining arrangement.

The invention claimed is:

1. A wind turbine, comprising:
   a retaining arrangement;
   a first bearing;
   a second bearing;
   a third bearing;
   a fourth bearing;
   a main shaft that rotates relative to the retaining arrangement by the first bearing and the second bearing;
   a direct drive generator;
   a rotor in the generator;
   a stator in the generator;
   a first supporting element of the rotor connected with the main shaft;
   a first supporting element of the stator supported on the main shaft by the third bearing;
   a second supporting element of the stator connected with the retaining arrangement; and
   a second supporting element of the rotor supported on the retaining arrangement by the fourth bearing.

2. The wind turbine as claimed in claim 1,
   wherein the first supporting element of the rotor comprises a first ringlike rotor end plate,
   wherein the second supporting element of the rotor comprises a second ringlike rotor end plate,
   wherein the first supporting element of the stator comprises a first ringlike stator end plate, and
   wherein the second supporting element of the stator comprises a second ringlike stator end plate.

3. The wind turbine as claimed in claim 1,
   wherein the first or the second supporting element of the rotor or the first or the second supporting element of the stator is substantially perpendicularly arranged relatively to a center axis of the main shaft, or
   wherein the first or the second supporting element of the rotor or the first or the second supporting element of the stator is at least partially and flexibly arranged in a direction of the center axis of the main shaft.

4. The wind turbine as claimed in claim 3, wherein the first or the second supporting element of the rotor and the first or the second supporting element of the stator are at least partially and flexibly arranged in the direction of the center axis of the main shaft.

5. The wind turbine as claimed in claim 3,
   wherein the first supporting element of the rotor is firmly supported on the main shaft and at least partially and flexibly arranged in the direction of the center axis of the main shaft, and wherein the second supporting element of the stator is firmly supported on the retaining arrangement and at least partially and flexibly arranged in the direction of the center axis of the main shaft.

6. The wind turbine as claimed in claim 1, wherein the rotor comprises a joining element for connecting the first supporting element of the rotor with the second supporting element of the rotor.

7. The wind turbine as claimed in claim 1, wherein the stator comprises a casing element for connecting the first supporting element of the stator with the second supporting element of the stator.

8. The wind turbine as claimed in claim 7, wherein the first supporting element of the stator and the second supporting element of the stator and the casing element build up a substantially hollow cylinder housing around the rotor.

9. The wind turbine as claimed in claim 1, wherein the fourth bearing comprises an inner bearing shell and an outer bearing shell.

10. The wind turbine as claimed in claim 9, wherein the inner bearing shell of the fourth bearing is connected to the retaining arrangement or to the second supporting element of the stator.

11. The wind turbine as claimed in claim 9, wherein the outer bearing shell of the fourth bearing is connected to the second supporting element of the rotor.

12. The wind turbine as claimed in claim 1, wherein the third bearing comprises an inner bearing shell and an outer bearing shell.

13. The wind turbine as claimed in claim 12, wherein the inner bearing shell of the third bearing is connected to the main shaft.

14. The wind turbine as claimed in claim 12, wherein the inner bearing shell of the third bearing is connected to the first supporting element of the rotor.

15. The wind turbine as claimed in claim 12, wherein the outer bearing shell of the third bearing is connected to the first supporting element of the stator.

16. The wind turbine as claimed in claim 1, wherein the retaining arrangement comprises a bedplate, a main frame, and a stationary shaft.

17. The wind turbine as claimed in claim 16, wherein the main frame is arranged on the bedplate and the stationary shaft is attached to the main frame.

18. The wind turbine as claimed in claim 16, wherein the main shaft rotates relative to the remaining arrangement on the stationary shaft by the first bearing and the second bearing.

19. The wind turbine as claimed in claim 1, further comprising a tower for arranging the direct drive generator on an upwind or a downwind side of the tower.

20. A wind turbine, comprising:
a retaining arrangement;
a first bearing;
a second bearing;
a third bearing;
a fourth bearing;
a main shaft that rotates relative to the retaining arrangement by the first bearing and the second bearing;
a direct drive generator;
a rotor in the generator;
a stator in the generator;
a first supporting element of the rotor connected with the main shaft;
a first supporting element of the stator supported on the first supporting element of the rotor by the third bearing;
a second supporting element of the stator connected with the retaining arrangement; and
a second supporting element of the rotor supported on the second supporting element of the stator by the fourth bearing.

* * * * *